United States Patent
Lee (10) Patent No.: US 9,121,988 B2
(45) Date of Patent: Sep. 1, 2015

(54) BACK LIGHT UNIT, METHOD OF MANUFACTURING THE SAME AND LIQUID CRYSTAL DISPLAY DEVICE INCLUDING THE SAME

(75) Inventor: Dal Jae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 234 days.

(21) Appl. No.: 13/561,212

(22) Filed: Jul. 30, 2012

(65) Prior Publication Data
US 2013/0107171 A1 May 2, 2013

(30) Foreign Application Priority Data

Oct. 26, 2011 (KR) .................. 10-2011-0109978
Feb. 28, 2012 (KR) .................. 10-2012-0020580

(51) Int. Cl.
*F21V 8/00* (2006.01)
*G02F 1/1333* (2006.01)
*F21S 8/00* (2006.01)
*F21V 17/00* (2006.01)

(52) U.S. Cl.
CPC ............ *G02B 6/0068* (2013.01); *G02B 6/0011* (2013.01); *G02B 6/0031* (2013.01); *G02B 6/0073* (2013.01); *G02B 6/0091* (2013.01); *F21S 8/00* (2013.01); *F21V 17/00* (2013.01); *G02B 6/009* (2013.01); *G02F 2001/133314* (2013.01); *G02F 2001/133317* (2013.01); *Y10T 29/53087* (2015.01)

(58) Field of Classification Search
USPC ........................................................ 349/65
See application file for complete search history.

(56) References Cited

U.S. PATENT DOCUMENTS

| | | | |
|---|---|---|---|
| 2005/0117319 A1* | 6/2005 | Kuo ............................... | 362/31 |
| 2008/0297695 A1* | 12/2008 | Sekiguchi et al. ............. | 349/65 |
| 2009/0316104 A1* | 12/2009 | Yang ............................. | 349/187 |
| 2011/0134359 A1* | 6/2011 | An et al. ........................ | 349/61 |
| 2011/0273631 A1* | 11/2011 | Hayashi ........................ | 348/790 |
| 2011/0304784 A1* | 12/2011 | Hirota et al. .................. | 349/15 |

FOREIGN PATENT DOCUMENTS

| | | |
|---|---|---|
| CN | 1687830 A | 10/2005 |
| CN | 101324725 A | 12/2008 |
| KR | 1020090043799 A | 5/2009 |
| WO | 2004/114000 A1 | 12/2004 |
| WO | WO 2010082377 A1 * | 7/2010 |

OTHER PUBLICATIONS

Office Action dated Aug. 4, 2014 from The State Intellectual Property of China in counterpart Chinese application No. 201210243506.6.

* cited by examiner

*Primary Examiner* — Dennis Y Kim
(74) *Attorney, Agent, or Firm* — Morgan, Lewis & Bockius LLP (57) ABSTRACT

The present invention relates to a back light unit including a bottom case; a first light source unit comprising first light sources and a first board, wherein the first light sources are placed above the first board; a second light source unit comprising second light sources and a second board, wherein the second light sources are placed below the second board; a light guide plate disposed between the first and second light sources; and a support main disposed above the light guide plate. The present invention also relates to an LCD device including the same and a method of making the same.

10 Claims, 4 Drawing Sheets

BACK LIGHT UNIT, METHOD OF MANUFACTURING THE SAME AND LIQUID CRYSTAL DISPLAY DEVICE INCLUDING THE SAME

CROSS-REFERENCE TO RELATED APPLICATION

This application claims priorities under 35 U.S.C. 119 to Korean Patent Application No. 10-2011-0109978, filed on Oct. 26, 2011, and No 10-2012-0020580, filed on Feb. 28, 2012, which is hereby incorporated by reference in its entirety.

BACKGROUND

1. Field of the Disclosure

This disclosure relates to a liquid crystal display (LCD) device, more particularly to a back light unit adapted to simultaneously prevent an assembly fault and brightness deterioration, and an LCD device including the same.

2. Description of the Related Art

Nowadays, LCD devices are gradually being used in a wide range of applications. This results from the fact that LCD devices have features, such as light weight, thinness, low power consumption, and others.

The LCD device is generally configured with a liquid crystal panel and a back light unit applying light to the liquid crystal panel. The liquid crystal panel includes a liquid crystal layer interposed between two substrates. Such a liquid crystal panel changes the direction of liquid crystal molecular alignment and causes regional differences in the transmittance of light passing through the liquid crystal layer. The regional transmittance differences allow an image to be displayed on the liquid crystal panel. However, the liquid crystal panel cannot emit light for itself Due to this, the LCD device requires a back light unit disposed at a side of the liquid crystal panel and configured to apply light to the liquid crystal panel.

The back light unit may include a reflective sheet, a light guide plate, a light source unit, a bottom case and a support main. The bottom case is used to accommodate the reflective sheet, the light guide plate and the light source unit. The support main is combined with the bottom case. Moreover, the back light unit may include both light source units each of which is disposed on both side surfaces of the light guide plate, in order to realize high brightness.

In order to assemble such a back light unit, two light source units are first placed within two opposite sides of the bottom case, respectively, and the reflective sheet and the light guide plate are sequentially disposed inside of the bottom case provided with the light source units. Then, the bottom case is engaged with the support main.

More specifically, the light guide plate is disposed between the light source units which are positioned inside of the bottom case. As such, the light guide plate may be disposed to contact the light source units at both sides of the guide plate. Due to such contacts, the light source units may be damaged and/or the light guide plate may also be damaged or deformed. To solve this matter, a fixed distance between the light guide plate and the light source units is kept by either reducing the size of the light guide plate or shifting the light source units toward the side walls of the bottom case beyond designed positions of the light source units. In other words, an assembly tolerance is provided between the light guide plate and the light source units in order to prevent an assembly fault of the back light unit. However, the assembly tolerance still causes light leakage and further deteriorates brightness of the back light unit.

In view of the above, there is a need for an alternative way to simultaneously prevent an assembly fault and brightness deterioration of the back light unit.

SUMMARY OF THE DISCLOSURE

The present embodiment is directed to a back light unit and an LCD device with the same that substantially obviate one or more problems due to the limitations and disadvantages of the related art.

Some embodiments of the present disclosure are to provide a back light unit which is adapted to prevent an assembly fault and/or brightness deterioration, and an LCD device including the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

An exemplary back light unit according to one aspect of the present invention is provided as follows. The back light unit may include: a bottom case; a first light source unit comprising first light sources and a first board, wherein the first light sources are placed above the first board; a second light source unit comprising second light sources and a second board, wherein the second light sources are placed below the second board; a light guide plate disposed between the first and second light sources; and a support main disposed above the light guide plate.

A method of manufacturing a back light unit according to another general aspect of the present disclosure is provided. The method may include: placing a first light source within a bottom case in a first direction; disposing a light guide plate next to the first light source; attaching a second light source to a support main; and combining the support main with the bottom case in such a manner that the second light source is placed between the light guide plate and an inner surface of the bottom case in a second direction different from the first direction.

An LCD device according to still another general aspect of the present disclosure is provided. The LCD device may includes: a bottom case; the back light unit as described herein; a liquid crystal panel disposed on the support main; and a top case combined with the support main and configured to encompass edges of the liquid crystal panel.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

It is to be understood that both the foregoing general description and the following detailed description of the present invention are only exemplary and are intended to provide further explanation of the invention as claimed.

BRIEF DESCRIPTION OF THE DRAWINGS

The accompanying drawings are included to provide a further understanding of the embodiments and are incorporated in and constitute a part of this application. The drawings illustrate embodiment(s) of the invention and together with the description serve to explain the disclosure. In the drawings.

DETAILED DESCRIPTION

Reference will now be made in detail to the embodiments of the present disclosure, examples of which are illustrated in the accompanying drawings. These embodiments introduced hereinafter are provided as examples in order to convey their spirits to the ordinary skilled person in the art.

Therefore, these embodiments might be embodied in a different shape, so are not limited to these embodiments described here. In the drawings, the size, thickness and so on of a device may have been exaggerated for convenience of explanation. Wherever possible, the same reference numbers will be used throughout this disclosure including the drawings to refer to the same or like parts.

Figure 1:
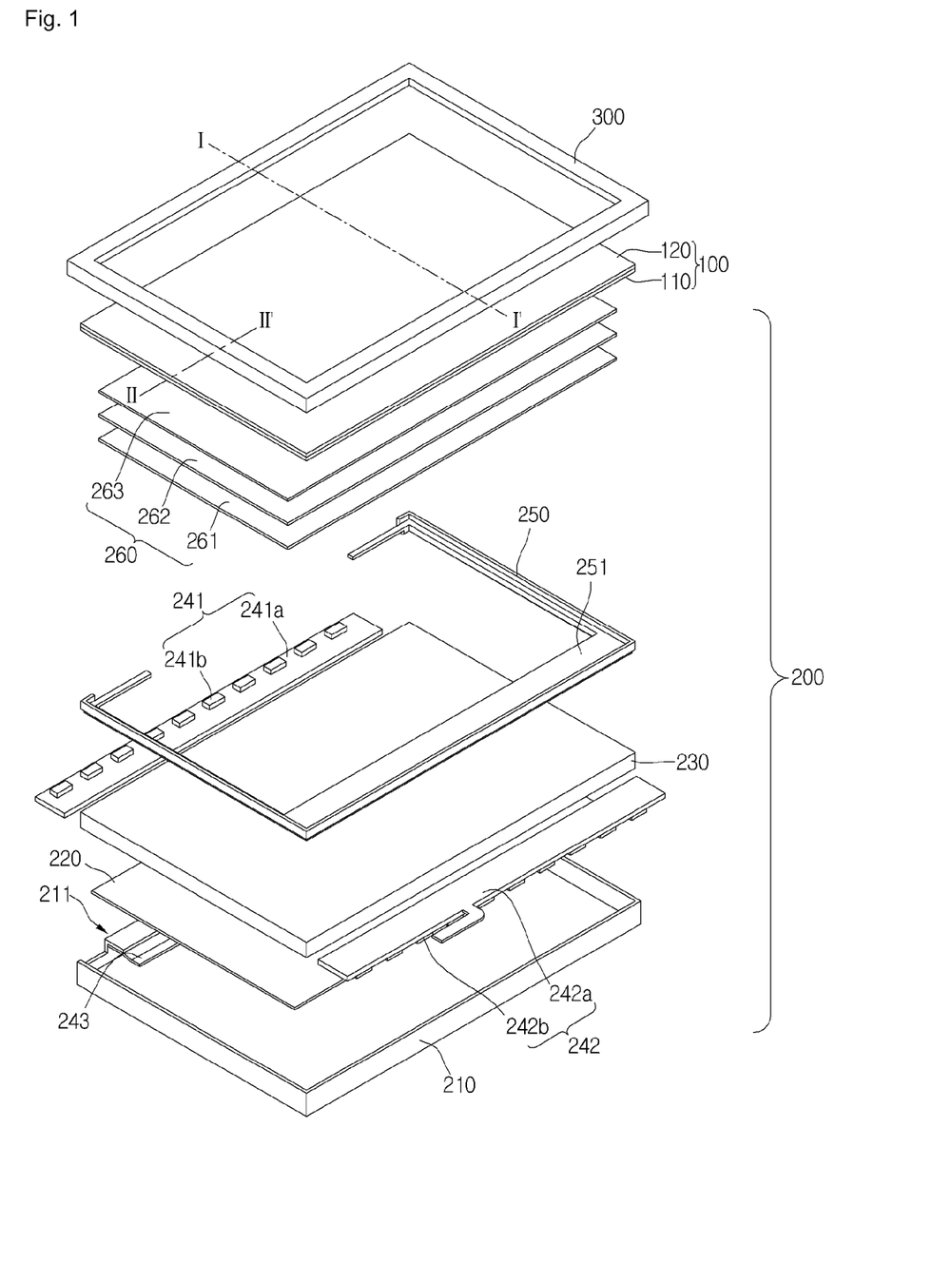
FIG. 1 is a disassembled perspective view showing an LCD device according to one embodiment of the present disclosure.
Figure 2:
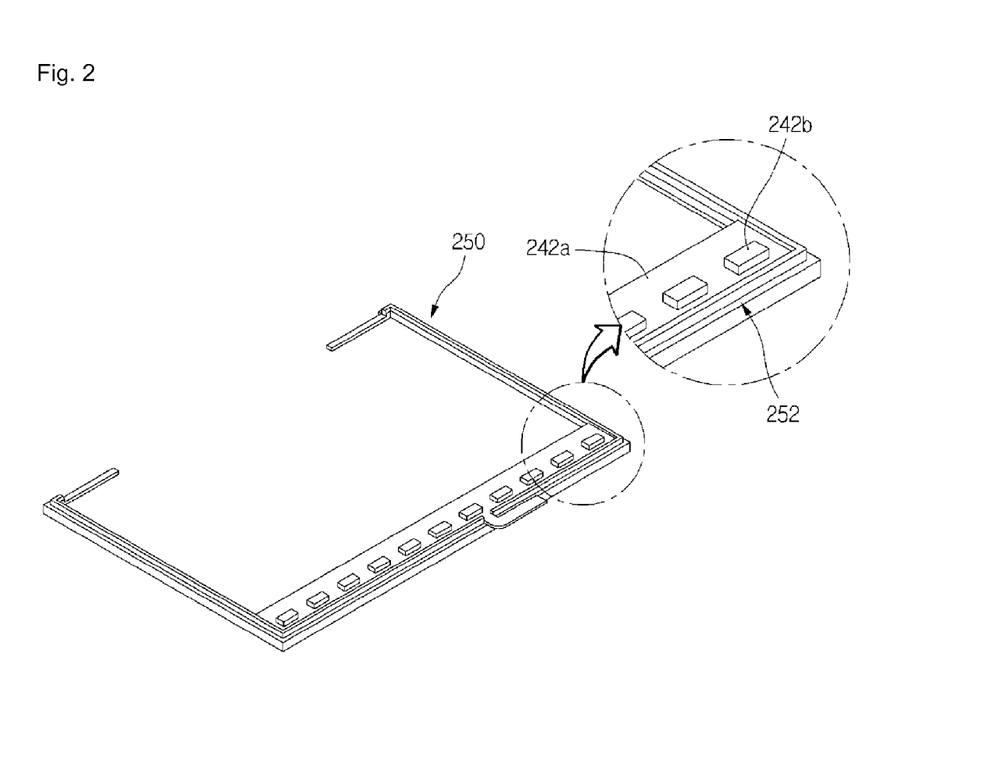
FIG. 2 is a perspective view showing the second light source unit attached to the reverse side of the support frame shown in FIG. 1.
Figure 3A:
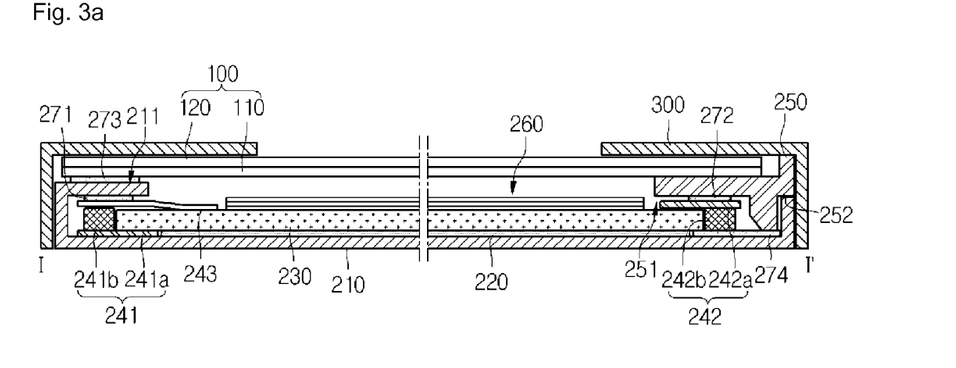
FIGS. 3a and 3b are a cross-sectional view showing a detailed view of an exemplary an LCD device shown in FIG. 1.
Figure 3B:
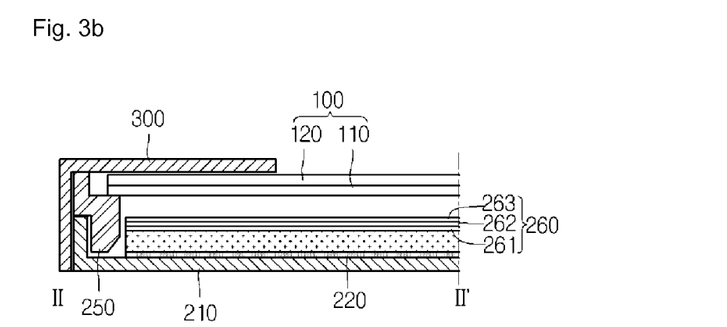

FIG. 1 is a disassembled perspective view showing an LCD device according to some embodiments of the present invention. FIG. 2 is a perspective view showing the second light source unit attached to the reverse side of the support frame shown in FIG. 1. FIGS. 3a and 3b are a cross-sectional view showing a detailed view of an exemplary an LCD device shown in FIG. 1.

Referring to FIG. 1, the LCD device according to some embodiments of the present invention may include a liquid crystal panel 100, a back light unit 200 and a top case 300.

In detail, the liquid crystal panel 100 may include first and second substrates 110 and 120 combined with each other and configured to face each other, and a liquid crystal layer (not shown) interposed between the first and second substrates 110 and 120. Although they are not shown in detail in the drawing, the first and second substrates 110 and 120 may each include a plurality of pixels. The pixels of the first substrate 110 may be defined by gate lines and data lines crossing each other. A thin film transistor and a pixel electrode may be disposed within each pixel of the first substrate 110. Also, the pixels of the second substrate 120 may be defined by a black matrix. A color filter may be disposed within each pixel of the second substrate 120. Moreover, a common electrode used to form an electric field along with the pixel electrode may be disposed on the first substrate 110 and/or the second substrate 120. It is well known to the ordinary skilled person in the art that such first and second substrates 110 and 120 may be formed in a variety of structure according to a driving mode of the LCD device, such as a TN mode, an IPS mode, a VA mode, a FSS mode and so on. Therefore, the LCD device provided in the present disclosure is not limited to the formations of the first and second substrates 110 and 120.

The LCD device may further include a gate driver circuitry and a data driver circuitry, which are not shown in the drawings. The gate driver circuitry applies drive signals to the liquid crystal panel 100. The data driver circuitry applies data signals to the liquid crystal panel 100. Such gate and data driver circuitries may be either mounted on a substrate of the liquid crystal panel 100 or connected to the liquid crystal panel 100 through connection members, such as tape carrier units (TCPs). Moreover, the LCD device may include polarizer sheets which are disposed on the outer surfaces of the first and second substrates 110 and 120.

The back light unit 200 is disposed on one surface of the liquid crystal panel 100 and configured to apply light to the liquid crystal panel 100. The transmittance of light applied from the back light unit 200 may be adjusted by the liquid crystal panel which controls an electric field applied to the liquid crystal layer, thereby displaying an image.

The top case 300 may fasten the back light unit 200 to one surface of the liquid crystal panel 100. To this end, the top case 300 may be configured to encompass the edges of the liquid crystal panel 100 and be combined with the back light unit 200.

Hereinafter, the back light unit 200 according to additional embodiment of the present invention will be explained in detail referring to FIGS. 1 through 3b.

Referring to FIGS. 1 through 3b, the back light unit 200 according to an embodiment of the present disclosure may include a bottom case 210, first and second light source units 241 and 242, a light guide plate 230 and a support main 250.

The first and second light source units 241 and 242 may be disposed in two sides of the bottom case 210, respectively. For example, the first light source unit 241 may be disposed along one inside of the bottom case 210. The second light source unit 242 may be disposed along another inside of the bottom case 210 opposite to one inside along which the first light source unit 241 is disposed.

The bottom case 210 may further include a shielding blade 211. The shielding blade may be bent inward from a top edge of one side wall of the bottom case 210 and may be configured to cover an upper surface of the first light source unit 241. As such, one side of the bottom case 210 may have a cross-section in a "⊏" shape, as well as the first light source unit 241 may be inserted into the inner part of the cross-sectional structure of the "⊏" shape as shown in FIG. 3a. The back light unit 200 may further include a reflective member 243 (shown in FIG. 3a) disposed on a lower surface of the shielding blade 211. The reflective member 243 may prevent a direct emission of light from the first light source unit 241 to the liquid crystal panel 100. As such, the reflective member 243 may enhance the brightness and picture quality of the LCD device. In some embodiments, the reflective member 243 may be a light source housing and/or a reflective film. Such a reflective member 243 may be attached to the lower surface of the shielding blade 211 by a first adhesive member 271. As an example of the first adhesive member 271, a double-sided adhesive tape and/or an adhesive material, such as acrylate, may be used. Alternatively, a reflective tape with an adhesive layer may be used as a reflective member 243, and the first adhesive member 271 may be removed.

Moreover, a part of the liquid crystal panel 100 may be disposed on the upper surface of the shielding blade 211. Herein, a third adhesive member 273 may be disposed between the shielding blade 211 and the liquid crystal panel 100. Thus, a part of the liquid crystal panel 100 may be fixed on the bottom case 210 by the third adhesive member 273. As an example of the third adhesive member 273, a double-sided adhesive tape and/or an adhesive material may be used.

Each of the first and second light source units 241 and 242 may include a board, such as a PCB (printed circuit board) 241a and 242a, respectively, on which a plurality of light sources 241b and 242b, respectively, are mounted. More specifically, the first light source unit 241 may include a first PCB 241a and a plurality of first light sources 241b, and the second light source unit 242 may include a second PCB 242a and a plurality of second light sources 242b. As an example of light sources 241b and 242b, a light emission diode chip may be used.

Each of the PCBs 241a and 242a may include a mounting surface mounted with the light sources 241b or 242b, and an adhesive surface opposite to the mounting surface. The adhesive surface of the first PCB 241a included in the first light source unit 241 may be attached to the bottom surface of the bottom case 210. As such, the first light sources 241b of the first light source unit 241 may be disposed toward a first direction, such as an upward direction, including the direction toward the liquid crystal panel 100 and toward an upper portion (i.e., the shielding blade 211) of the bottom case 210. That is, the first light sources 241b may be placed above the first PCB 241a.

Meanwhile, the adhesive surface of the second PCB 242a included in the second light source unit 242 may be attached by a second adhesive member 272 to a lower surface of the support main 250 facing the bottom case 210. As such, the second light sources 242b of the second light source unit 242 may be disposed toward a second direction, such as a downward direction, including the direction toward the bottom surface of the bottom case 210. That is, the second light sources 242b may be placed below the second PCB 242a.

In other words, the first and second light source units 241 and 242 may be disposed to tend toward opposite directions. As an example of the second adhesive member 272, a double-sided adhesive tape and/or an adhesive material may be used.

The second PCB 242a of the second light source unit 242 may further include a reflective layer (not shown) formed on the mounting surface. The reflective layer may be formed by either coating a reflective material on or attaching a reflective film to the mounting surface of the second PCB 242a. For example, the reflective material may be a paste containing a metal powder. The reflective film, for example, may be a metal film. Such a reflective layer may prevent a direct emission of light from the second light source unit 242 to the light crystal panel 100. Herein, second PCB 242a may comprise a wire and an insulation layer. Alternatively, the reflective layer may be formed in an insulation layer of the second PCB 242a. Thus, in some embodiments, the insulation layer may also serve as a reflective layer.

The light guide plate 230 functions to guide the first and second light source units 241 and 242 to uniformly apply lights to the liquid crystal panel 100. To this end, the light guide plate 230 may be placed within the bottom case 210, and may be disposed between the first and second light source units 241 and 242. In one aspect of the present invention, the first and second light source units 241 and 242 are disposed to emit lights toward the light guide plate. In another aspect of the present invention, the first and second light source units 241 and 242 are placed in parallel with each other, emitting lights toward each other.

In some embodiments, the first light sources 241b of the first light source unit 241 are placed on the first board 241a, and the second light sources 242b of the second light source unit 242 are placed below the second board 242a. In further embodiments, the first board 241a of the first light source unit 241 is adhered to at least a portion of the bottom surface of the bottom case, and the second board 242a of the second light source unit 242 is adhered to at least a portion of the lower surface of the support main. In additional embodiments, each of the first and second light source units 241 and 242 is disposed to each of two diagonally opposite edges of the light guide plate 230. And, the first and second sources 241b and 242b of the first and second light source units 241 and 242 are disposed in parallel with two diagonally opposite edges of the light guide plate. Also, the first and second boards 241a and 242a of the first and second light source units 241 and 242 are disposed on a lower surface and a upper surface of the light guide plate, respectively. In other words, the first and second light source units 241 and 242 are disposed to encompass two diagonally opposite edge lines of the light guide plate 230, respectively. As such, the light guide plate 230 may be compactly combined with the first and second light source units 241 and 242. This compact combination of the light guide plate 230 and the first and second light source units 241 and 242 prevents light leakage and/or brightness deterioration.

The drawings illustrate a light guide plate 230 formed to have a uniform thickness, but the back light unit 200 according to other embodiments of the present disclosure is not required to have a shape of the light guide plate 230 shown in the drawings. Alternatively, the light guide plate 230 may be formed to have a thinner center portion than side portions, in order to reduce its thickness.

The back light unit 200 may further include a reflective sheet 220 disposed between the bottom surface of the bottom case 210 and the light guide plate 230. The reflective sheet 220 may enhance light efficiency by reflecting light progressing from the light guide plate 230 to the bottom surface of the bottom case 210 toward the light guide plate 230.

Moreover, the back light unit 200 may further include optical sheets 260 disposed on the light guide plate 230. The optical sheets 260 include a diffusion sheet 261, a converging sheet 262 and a protective sheet 263. The diffusion sheet 261 is used to scatter light applied from the light guide plate 230. The converging sheet 262 is used to converge the scattered light applied from the diffusion sheet 261. The protective sheet 263 is used to protect the converging sheet 262.

The support main 250 is combined with the bottom case 210 which accommodates the first and second light source units 241 and 242, the reflective sheet 220, the light guide plate 230 and the optical sheets 260. The support main 250 may be formed of a polygonal frame shape. For example, the support main 250 may be formed in a tetragonal frame shape. In some embodiments, the support main 250 includes a one side having an opening. The first light source unit 241 may be disposed under the one side having the opening. Also, the support main 250 may include a stepped holding portion 252 (shown in FIG. 3a) to allow the bottom case to be seated easily thereon. The stepped holding portion 252 is formed along a lower outside of the support main 250. The stepped holding portion 252 of the support main 250 enables the support main 250 to be disposed stably on the bottom case 210 when the support main 250 is combined with the bottom case 210. In some embodiments, the stepped holding portion 252 of the support main 250 may be placed on the upper side of the bottom case.

Furthermore, the support main 250 may further include a stepped guide portion 251 formed at a lower inside which is opposite to the lower outside with the stepped holding portion 252. In particular, as shown in FIGS. 2 and 3a, the stepped guide portion 251 may be at a lower portion of an inward extension from one side of the support main 250. In additional embodiments, also as shown in FIGS. 2 and 3a, the extension is from only a part of the support main 250. That is, the stepped guide portion 251 may be formed at a lower surface of the support main 250 facing the bottom surface of the bottom case 210 and corresponds to the second light source unit 242. Herein, the second light source unit 242 is disposed in the stepped guide portion 251. Such a stepped guide portion 251 guides the second source unit 242 to be attached to the support main 250. That is, the stepped guide portion 251 may allow to seat easily and safely the second light source unit 242 on the support main 250.

Additionally, the second light source unit 242 may be safely fastened to the bottom case 210 by a fourth adhesive member 274 which is disposed between the second light source 242b of the second light source unit 242 and the bottom surface of the bottom case 210. In further embodiments, the fourth adhesive member 274 may also be expanded not only to a region under one edge portion of the light guide plate 230 but also to another region under the stepped guide portion 251 of the support main 250. Therefore, the second light source unit 242 together with the light guide plate 230 and the support main 250 may be safely fastened to the bottom case 210

In this manner, the back light unit according to the first embodiment of the present disclosure includes the first and second light source units disposed to face the opposite directions to each other and positioned at both diagonally opposite edges of the light guide plate. Therefore, the back light unit and the LCD device including the same may be compactly configured. Also, brightness deterioration may be prevented.

FIGS. 4 through 7 are cross-sectional views illustrating an exemplary process of manufacturing a back light unit which is included in an LCD device according to another embodiment of the present disclosure. The description of the first embodiment to be repeated in the second embodiment of the present disclosure will be omitted. Moreover, the components according to the second embodiment will be referred to with the same numbers as those according to one embodiment.

Figure 4:
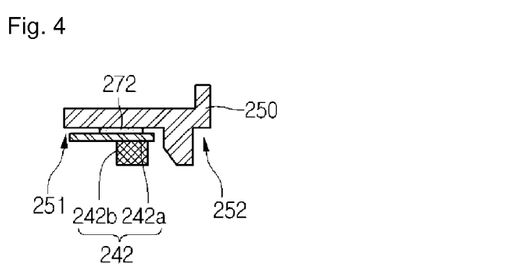
FIGS. 4 through 7 are cross-sectional views illustrating an exemplary process of manufacturing a back light unit included in an LCD device according to another embodiment of the present disclosure.

Referring to FIG. 4, in order to manufacture a back light unit according to an embodiment or the present disclosure, a support main 250 is prepared. The support main 250 may be formed in a polygonal frame shape with an opening. For example, the support main 250 may be formed in a tetragonal frame shape. Also, the support main 250 may include a stepped guide portion 251 formed in a lower inside thereof The support main 250 may further include a stepped holding portion 252 formed at opposite side of the stepped guide portion 251 to allow the bottom case 210 to be easily and safely seat thereon.

Then, a second light source unit 242 may be attached to a lower surface region of the support main adjacent to the stepped guide portion 251. The second light source unit 242 may include a plurality of second light sources 242b and a second PCB 242a mounted with the plurality of second light sources 242b. The second PCB 242a may include a mounting surface used for mounting the second light sources 242b and an adhesive surface opposite to the mounting surface. The second light source unit 242 may further include a reflective material layer formed on the mounting surface of the second PCB 242a. Such a second light source unit 242 may be attached to the support main 250 by a second adhesive member 272. In some embodiments, the second PCB 242a and/or the stepped guide portion 251 of the support main 250 may have an adhesive surface that can be attached to the second adhesive member 272.

Figure 5:
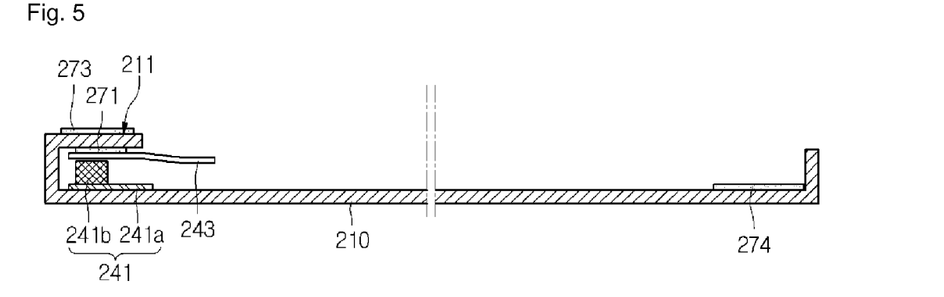

Referring to FIG. 5, a bottom case 210 may be prepared separately from the attachment of the second light source unit 242 to the support main 250.

A first light source unit 241 is placed at one inside of the bottom case 210, optionally under a shielding blade 211. The first light source unit 241 may include a plurality of first light sources 241b and a first PCB 241a mounted with the plurality of first light sources 241b. The first PCB 241a may include a mounting surface used for mounting the first light sources 241b and an adhesive surface opposite to the mounting surface. The adhesive surface of the first PCB 241a may be disposed on the bottom surface of the bottom case 210. As such, the first light sources 241b may be arranged toward an upper portion of the bottom case 210.

The bottom case 210 may further include a shielding blade 211 bent inward from a top edge of one side wall of the bottom case 210 and configured to cover an upper surface of the first light source unit 241. As such, one edge portion of the bottom case 210 may have a cross-section in a "⊏" shape, as well as the first light source unit 241 may be inserted into the inner part of the cross-sectional structure of the "⊏" shape.

A reflective member 243 may further be disposed on a lower surface of the shielding blade 211 facing the first light source unit 241. The reflective member 243 may become a light source housing. As such, the reflective member 243 may be disposed on the lower surface of the shielding blade 211 while the first light source unit 241 is placed below the reflective member 243. Such a reflective member 243 may be fastened to the lower surface of the shielding blade 211 by a first adhesive member 271 placed on the lower surface of the shielding blade 211. As an example of the first adhesive member 271, a double-sided adhesive tape and/or an adhesive material may be used. The back light unit according to the embodiment of the present disclosure is not limited to this. In other embodiments, the reflective member 243 may be a reflective film without an adhesive layer and/or a reflective tape with an adhesive layer. In case the reflective tape with the adhesive layer may be used as a reflective member 243, the first adhesive member 271 may be removed.

A fourth adhesive member 274 may be provided to another inside of the bottom case 210 which faces the second light source unit 242. Moreover, a third adhesive member 273, which is adhered to the liquid crystal liquid crystal panel later, may be provided to an upper surface of the shielding blade 211 of the bottom case 210.

Figure 6:
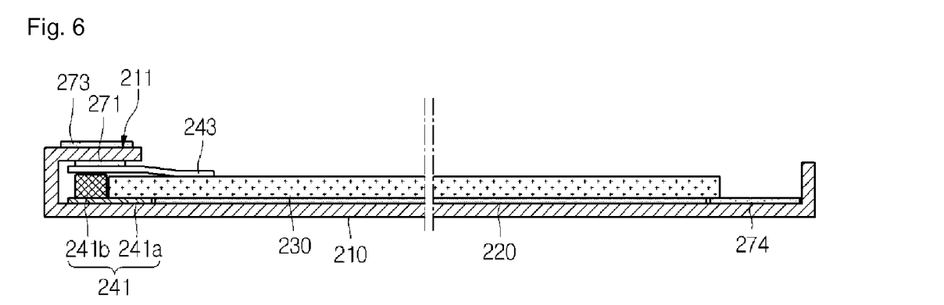

As shown in FIG. 6, a reflective sheet 220 is disposed on the bottom case 210 before a light guide plate 230 is placed on the reflective sheet 220. The light guide plate 230 is positioned by the side of the first light source unit 241. Such a light guide plate 230 may be fastened to the bottom case 210 by adhering at least a portion of its lower surface to the fourth adhesive member 274. Although they are not shown in the drawing, optical sheets 260 may be disposed on the light guide plate 230.

Figure 7:
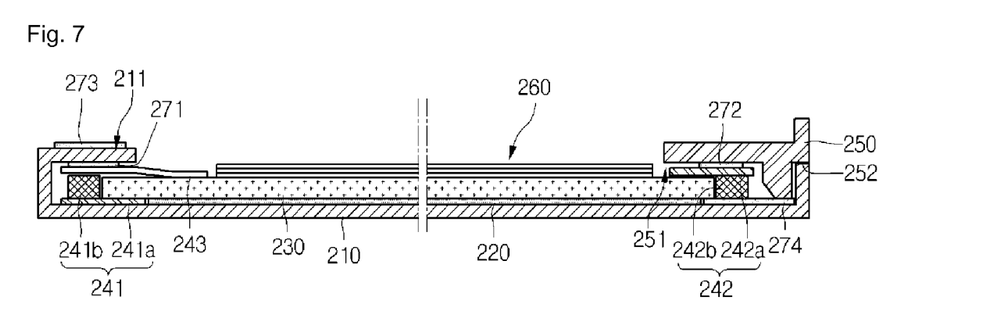

As shown in FIG. 7, the support main 250 attached with the second light source unit 242 is combined with the bottom case 210 into which the first light source unit 241 and the light guide plate 230 are accommodated to make a backlight unit. At this time, the second light source unit 242 is disposed on one side of the light guide plate 210 facing a different side of the bottom case 210 compared to the first light source unit 241. For example, the second light sources 242b may be arranged toward the bottom surface of the bottom case 210. More specifically, each of the first and second light source units 241 and 242 is disposed to each of two diagonally opposite edges of the light guide plate 230.

When the first and second light source units 241 and 242 are placed at the diagonally opposite edges of the light guide plate 230, the first and second light source units 241 and 242 and the light guide plate 230 may be placed within the bottom case 210 in a sequence of the first light source unit 241, the light guide plate 230 and the second light source unit 242. Specifically, the light guide plate may be placed between the first light source unit 241 and the second light source unit 242 in a horizontal direction. As such, assembly interference between the first and second light source units 241 and 242 and the light guide plate 230 may be reduced, and furthermore assembly tolerances between the first and second light source units 241 and 242 and the light guide plate 230 may be reduced. Therefore, brightness deterioration and an assembly fault may be prevented.

Although it is not shown in the drawing, the combination of the bottom case 210 with the support main 250 may be performed by at least one engaging hole and engaging protrusion. The engaging hole and the engaging protrusion are formed at one or more regions between the support main 250 and the bottom case 210, which are opposite to each other and combined with each other.

In additional embodiments, the stepped holding portion 252 of the support main 250 may be placed on the bottom case 210. As such, the support main 250 may be fastened stably to the bottom case 210. Moreover, the second PCB 242a of the second light source unit 242 attached to the support main 250 may shield the lower surface of the support main 250 from the light guide plate 230. To this end, the second PCB 242a may include a reflective material layer formed on its mounting surface. As such, light direct applied from the second light source unit 242 to the liquid crystal panel 100 may be shielded.

Furthermore, optical sheets 260 may be disposed on the light guide plate 230. The optical sheets 260 include a diffusion sheet 261, a converging sheet 262 and a protective sheet 263.

In this way, the assembling method of a back light unit according to the second embodiment of the present disclosure may place the first and second light source units and the light guide plate within the bottom case 210 where the light guide plate is placed between the first and second light sources (e.g. in sequence of the first light source unit, the light guide plate and the second light source unit). As such, assembly interference between the first and second light source units and the light guide plate may be reduced. Therefore, an assembly tolerance of the back light unit may be reduced, as well as an assembly error of the back light unit may be prevented.

Also, the light source units are disposed at both diagonally opposite edges of the light guide plate and toward the opposite directions. Therefore, not only the back light unit and the LCD device may be compactly configured, but also brightness deterioration may be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A back light unit comprising:
    a bottom case;
    a light guide plate having an upper surface, a lower surface, and edge surfaces;
    a first light source unit comprising first light sources and a first board, wherein the first light sources are disposed above the first board and adjacent to a first edge surface of the light guide plate;
    a second light source unit comprising second light sources and a second board, wherein the second light sources are disposed below the second board and adjacent to a second edge surface of the light guide plate opposite the first edge so that the light guide plate is disposed between the first and second light sources;
    a support main disposed above the light guide plate,
    wherein the first board is disposed on the lower surface of the light guide plate and the second board is disposed on the upper surface of the light guide plate;
    wherein the support main comprises first and second stepped guide portions formed at a lower inside thereof to seat the second light source unit and the bottom case, respectively;
    wherein the bottom case further comprises a shielding blade configured to cover an upper surface of the first light source unit;
    wherein the second light source unit further comprises a reflective material disposed on a surface of the second board and is configured to cover at least a portion of a lower surface of the support main facing the light guide plate; and
    a reflective member disposed on a lower surface of the shielding blade and configured to cover the first light source unit.

2. The back light unit according to claim 1, wherein the first board is adhered to at least a portion of a bottom surface of the bottom case, and the second board is adhered to at least a portion of the lower surface of the support main.

3. The back light unit according to claim 1, further comprising an adhesive member interposed between the second light source unit and a bottom surface of the bottom case.

4. The back light unit according to claim 1, wherein each of the first and second boards is a printed circuit board.

5. An LCD device comprising:
    the back light unit of claim 1;
    a liquid crystal panel disposed on the support main; and
    a top case combined with the support main and configured to encompass edges of the liquid crystal panel.

6. The LCD device according to claim 5, wherein the first board is adhered to at least a portion of a bottom surface of the bottom case, and the second board is adhered to at least a portion of the lower surface of the support main.

7. A method of assembling a back light unit, the method comprising:
    placing a first light source unit comprising first light sources and a first board within a bottom case in a first direction;
    disposing a light guide plate next to the first light source unit;
    attaching a second light source unit comprising second light sources and a second board to a support main; and
    combining the support main with the bottom case in such a manner that the second light source unit is placed between the light guide plate and an inner surface of the bottom case in a second direction different from the first direction,
    wherein the light guide plate has an upper surface, a lower surface, and edge surfaces;
    wherein the first board is disposed on the lower surface of the light guide plate and the second board is disposed on the upper surface of the light guide plate, and wherein each of the first and second light sources is disposed adjacent to each of two opposite edge surfaces of the light guide plate;

wherein the support main comprises first and second stepped guide portions formed at a lower inside thereof to seat the second light source unit and the bottom case, respectively;

wherein the bottom case further comprises a shielding blade configured to cover an upper surface of the first light source unit;

wherein the second light source unit further comprises a reflective material disposed on a surface of the second board and is configured to cover at least a portion of a lower surface of the support main facing the light guide plate; and a reflective member disposed on a lower surface of the shielding blade and configured to cover the first light source unit.

8. The method according to claim 7, further comprising mounting the first light source on the first board, and attaching the first board to a bottom surface of the bottom case.

9. The method according to claim 8, wherein the first board is attached to the bottom surface of the bottom case by an adhesive member.

10. The method according to claim 7, wherein the second light source unit is attached to the support main at the lower surface of the support main facing the bottom case, and the combining of the support main and the bottom case is performed after the attaching.

\* \* \* \* \*